(12) United States Patent
Momoshima et al.

(10) Patent No.: US 12,115,876 B2
(45) Date of Patent: Oct. 15, 2024

(54) AUTOMATED VALET PARKING SYSTEM, METHOD FOR PROVIDING AUTOMATED VALET PARKING SERVICE, AND NON-TRANSITORY COMPUTER-READABLE STORAGE MEDIUM

(71) Applicant: TOYOTA JIDOSHA KABUSHIKI KAISHA, Toyota (JP)

(72) Inventors: Shogo Momoshima, Nagoya (JP); Ryuji Okamura, Gotemba (JP); Tetsushi Okamoto, Miyoshi (JP); Hirokazu Kobayashi, Nagoya (JP); Daiki Kaneichi, Tokyo-to (JP); Minoru Nakadori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 17/749,447

(22) Filed: May 20, 2022

(65) Prior Publication Data

US 2022/0388421 A1 Dec. 8, 2022

(30) Foreign Application Priority Data

Jun. 4, 2021 (JP) .................................. 2021-094342

(51) Int. Cl.
*B60L 53/67* (2019.01)
*B60L 53/66* (2019.01)
(Continued)

(52) U.S. Cl.
CPC ............... *B60L 53/67* (2019.02); *B60L 53/66* (2019.02); *B60L 58/10* (2019.02); *B60W 30/06* (2013.01); *B60W 2510/244* (2013.01)

(58) Field of Classification Search
CPC .......... B60L 53/67; B60L 53/66; B60L 58/10; B60W 30/06; B60W 2510/244;
(Continued)

(56) References Cited

U.S. PATENT DOCUMENTS

2018/0212438 A1* 7/2018 Bouman ................. B60L 53/63
2020/0198489 A1   6/2020 Yoon
(Continued)

FOREIGN PATENT DOCUMENTS

CN   105574997 A   5/2016
CN   110827572 A   2/2020
(Continued)

*Primary Examiner* — Muhammad Shafi
(74) *Attorney, Agent, or Firm* — Sughrue Mion, PLLC

(57) ABSTRACT

An automated valet parking system enables a plurality of charging parking frames in a parking place to be utilized and reduces inconvenience to an EV user using an automated valet parking service. The management device acquires a vehicle usage schedule and a remaining charge amount of each EV and determines a parking frame usage schedule of a charging parking frame. Specifically, with respect to an EV scheduled to be used on the next day, the management device assigns a charging parking frame closer to the departure/arrival place to an EV having earlier use start time on the next day. With respect to an EV not scheduled to be used on the next day and an EV whose usage schedule is unknown, the management device assigns a charging parking frame farther from the departure/arrival place to an EV with smaller remaining charge amount.

6 Claims, 8 Drawing Sheets

(51) Int. Cl.
*B60L 58/10* (2019.01)
*B60W 30/06* (2006.01)

(58) Field of Classification Search
CPC . B62D 15/0285; Y02T 10/70; Y02T 10/7072; Y02T 90/12; G08G 1/148; G07F 15/005; G07F 17/0057
USPC .......................................................... 701/22
See application file for complete search history.

(56) References Cited

U.S. PATENT DOCUMENTS

2021/0035039 A1* 2/2021 Suzuki ............. G06Q 10/06311
2021/0078601 A1 3/2021 Sugano
2021/0184479 A1 6/2021 Fukubayashi et al.

FOREIGN PATENT DOCUMENTS

| CN | 112519763 A | | 3/2021 |
|----|-------------|---|--------|
| JP | 2019-075875 | * | 5/2019 |
| JP | 2019-075875 A | | 5/2019 |
| JP | 2020-102220 A | | 7/2020 |
| WO | 2017/159506 A1 | | 9/2017 |

\* cited by examiner

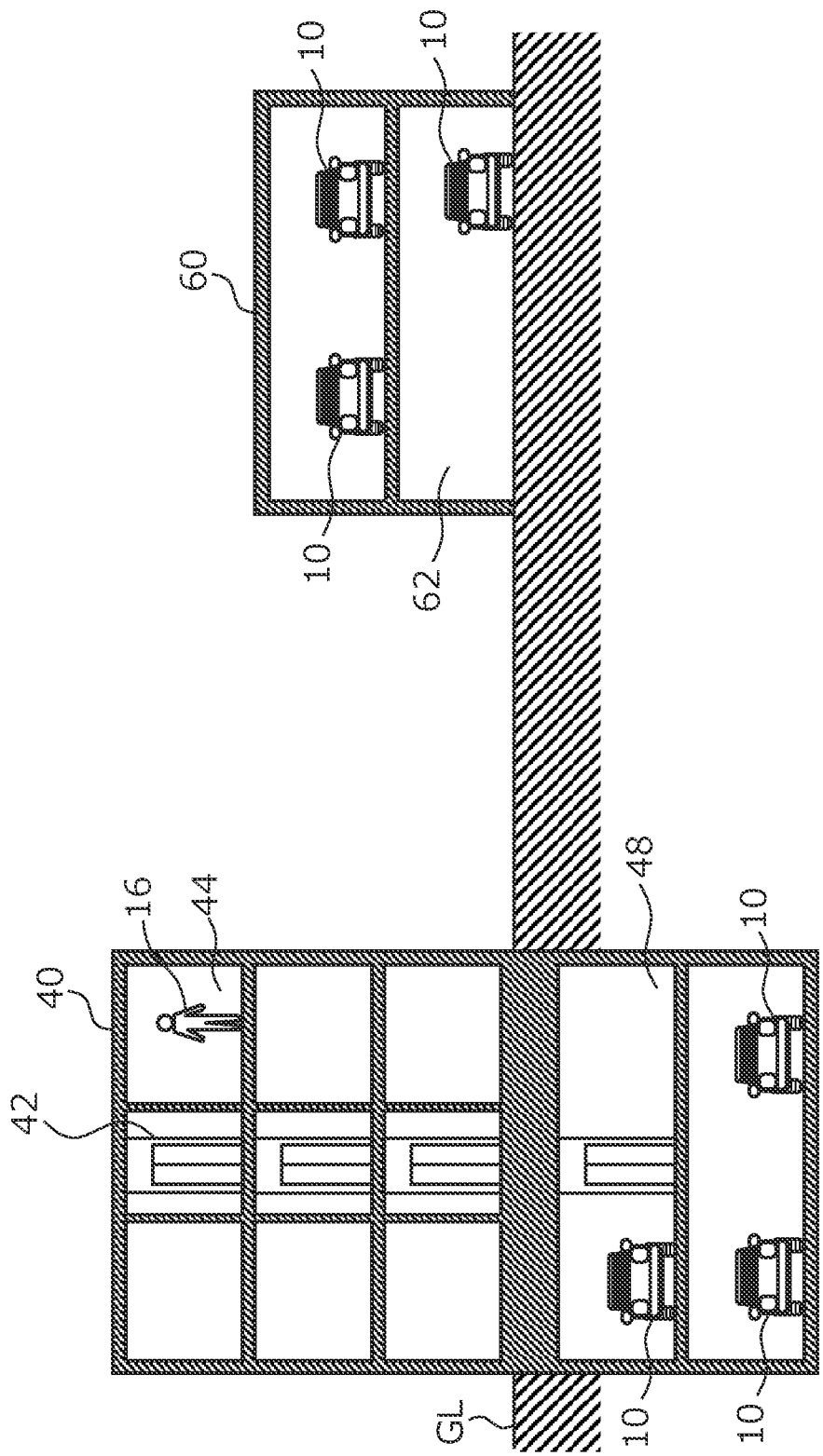

AUTOMATED VALET PARKING SYSTEM, METHOD FOR PROVIDING AUTOMATED VALET PARKING SERVICE, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2021-094342, filed Jun. 4, 2021, the contents of which application are incorporated herein by reference in their entirety.

BACKGROUND

Field

The present disclosure relates to an automated valet parking system for providing an automated valet parking service in a parking place including a plurality of charging parking frames with different distances from a departure/arrival place and used by a plurality of EVs. Further, the present disclosure relates to a method for providing an automated valet parking service in the above parking place. Furthermore, the present disclosure relates to a program for causing a computer to manage parking positions of a plurality of EVs in the above parking place. The program may be recorded on a non-transitory computer-readable storage medium.

Background Art

WO 2017/159506 discloses a vehicle charging system for charging a plurality of vehicles using a non-contact charging device. In this vehicle charging system, vehicles to be charged are selected in descending order of the free capacity of storage batteries or in ascending order of expected departing times, and they are charged by moving either pallets on which the selected vehicles to be charged are mounted, the charging device, or both.

Incidentally, the following JP2020-102220A and JP2019-075875A are exemplified in addition to the above WO2017/159506 as documents showing the technical level in the technical field of the present disclosure at the time of applying.

SUMMARY

With the popularization of EVs in recent years, in a parking place used for an automated valet parking service, a plurality of parking frames are used as charging parking frames to charge EVs in some cases. However, in the above-described conventional technology, although the order in which charging devices are used among the plurality of EVs is taken into consideration, no review is made on the assumption that there are a plurality of charging parking frames. More specifically, it is not taken into consideration how to utilize a plurality of charging parking frames existing in a parking place to reduce inconvenience to EV users using an automated valet parking service.

The present disclosure is made in view of above-described problems. An object of the present disclosure is to provide a technology for utilizing a plurality of charging parking frames existing in a parking place so as to reduce inconvenience to EV users using an automated valet parking service.

The present disclosure provides an automated valet parking system. The automated valet parking system of the present disclosure is a system for providing an automated valet parking service in a parking place which includes a plurality of charging parking frames having different distances from a departure/arrival place and is used by a plurality of EVs. The automated valet parking system of the present disclosure comprises a storage device storing a vehicle usage schedule for each of the plurality of EVs, and a management device managing parking positions of the plurality of EVs in the parking place. The management device acquires a remaining charge amount of each of the plurality of EVs. Then, the management device determines a parking frame usage schedule of the plurality of charging parking frames based on the vehicle usage schedule of each of the plurality of EVs and the remaining charge amount of each of the plurality of EVs, and move the plurality of EVs within the parking place according to the determined parking frame usage schedule.

Here, the parking frame usage schedule is determined so that, with respect to an EV scheduled to be used on the next day, a charging parking frame closer to the departure/arrival place is assigned to an EV with an earlier use start time on the next day. Further, the parking frame usage schedule is determined so that, with respect to an EV not scheduled to be used on the next day and an EV with unknown usage schedule, a charging parking frame farther from the departure/arrival place is assigned to an EV with smaller remaining charge amount.

For the automated valet parking system of the present disclosure, the management device may assign a charging parking frame close to the departure/arrival place to an EV whose scheduled use time and date is registered in the vehicle usage schedule in preference to an EV whose scheduled use time and date is not registered in the vehicle usage schedule.

For the automated valet parking system of the present disclosure, the plurality of charging parking frames may include a quick charging parking frame with a quick charging device and a normal charging parking frame with a normal charging device. In this case, the management device may preferentially assign a quick charging parking frame to an EV scheduled to be used today and may preferentially assign the normal charging parking frame to an EV not scheduled to be used today.

For the automated valet parking system of the present disclosure, at least some of the plurality of EVs may be sharing service vehicles. In this case, the management device may preferentially rent out a sharing service vehicle parked in a charging parking frame close to the departure/arrival place when requested to rent out the sharing service vehicle.

The present disclosure provides a method for providing an automated valet parking service, more particularly, a method for providing an automated valet parking service in a parking place including a plurality of charging parking frames with different distances from a departure/arrival place and used by a plurality of EVs. The method for providing an automated valet parking service of the present disclosure comprises the following steps. The first step is a step of registering a vehicle usage schedule for each for the plurality of EVs in advance. The second step is a step of acquiring a remaining charge amount of each of the plurality of EVs. The third step is a step of determining a parking frame usage schedule of the plurality of charging parking frames based on the vehicle usage schedule for each of the plurality of EVs and the remaining charge amount for each of the plurality of EVs. According to the parking frame usage schedule determined in the third step, with respect to an EV scheduled to be used on the next day, a charging parking frame closer to the departure/arrival place is assigned to an EV with an earlier use start time on the next day. Further, with respect to an EV not scheduled to be used on the next day and an EV with unknown usage schedule, a charging parking frame farther from the departure/arrival place is assigned to an EV with smaller remaining charge amount. Further, the fourth step is a step of moving the plurality of EVs within the parking place according to the parking frame usage schedule.

The present disclosure provides a program that causes a computer to execute. The program of the present disclosure is a program that causes a computer to manage parking positions of a plurality of EVs in a parking place to provide an automated valet parking service in the parking place which includes a plurality of charging parking frames with different distances from a departure/arrival place and is used by a plurality of EVs. The program of the present disclosure causes a computer to execute following processes. The first process is a process of acquiring a vehicle usage schedule of each of the plurality of EVs registered in advance. The second process is a process of acquiring a remaining charge amount of each of the plurality of EVs. The third process is a process of determining a parking frame usage schedule of the plurality of charging parking frames based on the vehicle usage schedule for each of the plurality of EVs and the remaining charge amount for each of the plurality of EVs. According to the parking frame usage schedule determined in the third process, with respect to an EV scheduled to be used on the next day, a charging parking frame closer to the departure/arrival place is assigned to an EV with earlier use start time on the next day. Further, with respect to an EV not scheduled to be used on the next day and an EV with unknown usage schedule, a charging parking frame farther from the departure/arrival place is assigned to an EV with smaller remaining charge amount. The fourth process is a process of moving the plurality of EVs within the parking place according to the parking frame usage schedule.

According to the technology of the present disclosure, with respect to an EV scheduled to be used on the next day, a charging parking frame closer to the departure/arrival place is assigned to an EV having an earlier use start time on the next day. As a result, since an EV parked in a charging parking frame close to the departure/arrival place can be made to depart earlier, it is possible not only to reassure an EV user who desires an early departure, but also prevent traffic congestion due to flow line interference between EVs.

In addition, according to the technology of the present disclosure, with respect to an EV not scheduled to be used on the next day and an EV with unknown usage schedule, a charging parking frame farther from the departure/arrival place is assigned to an EV with smaller remaining charge amount. By assigning a charging parking frame far from the departure/arrival place to an EV which requires time for charging, it is possible to prevent a decrease in turnover of a charging parking frame close to the departure/arrival place.

Thus, the technology of the present disclosure reduces inconvenience to an EV user using the automated valet parking service.

BRIEF DESCRIPTION OF THE DRAWINGS

FIG. 8 is a schematic diagram showing another example of the automated valet parking facility to which an automated valet parking system relating to each embodiment of the present disclosure is applicable.

DETAILED DESCRIPTION

Hereinafter, embodiments of the present disclosure are described with reference to the accompanying drawings. Hereinafter, in embodiments described below, when a number like a number of a certain thing, quantity, amount, range, or the like of each element is referred to, the idea relating to the present disclosure is not limited to the number referred to, except when it is particularly clarified, or the number is clearly specified in principle. In addition, the structure and the like in the embodiments described below are not necessarily essential to the idea relating to the present disclosure, except when particularly clarified or explicitly specified in principle.

1. First Embodiment

Figure 1:
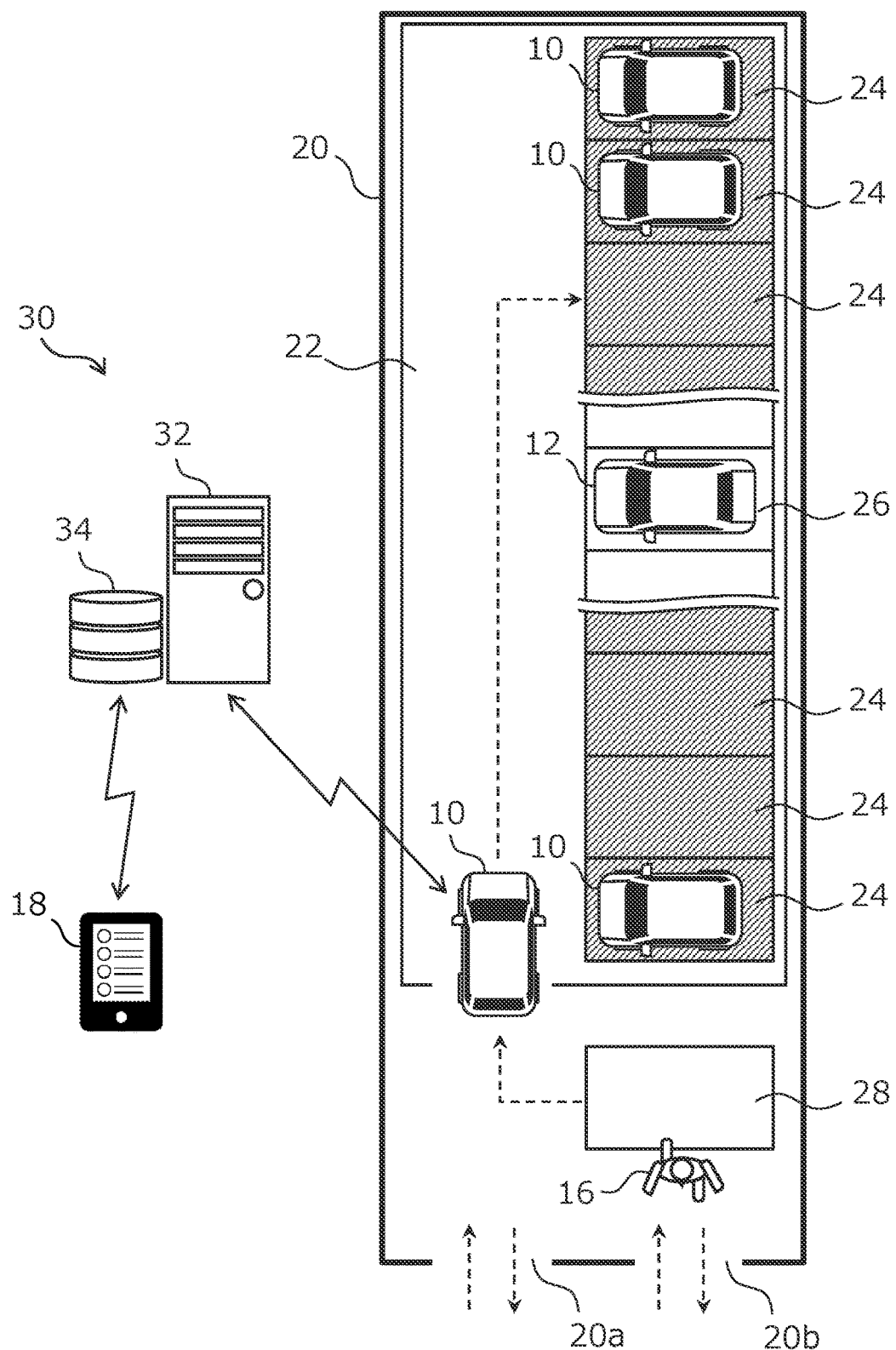
FIG. 1 is a schematic diagram of an automated valet parking facility to which the automated valet parking system relating to the first embodiment of the present disclosure is applied.

FIG. 1 is a schematic diagram of an automated valet parking facility 20 to which an automated valet parking system 30 relating to the first embodiment of the present disclosure is applied. The automated valet parking system 30 of the present embodiment provides an automated valet parking service in the automated valet parking facility 20 having the structural features as illustrated in FIG. 1. The automated valet parking service provided by the automated valet parking system 30 includes assigning a parking frame to vehicles 10 and 12 within the automated valet parking facility 20 and guiding the vehicles 10 and 12 by automatic driving within the automated valet parking facility 20.

The automated valet parking facility 20 illustrated in FIG. 1 has a doorway 20a for the vehicles 10 and 12. The automated valet parking facility 20 has a departure/arrival place 28, in which a user 16 gets on and gets off the vehicles 10 and 12, in the place immediately after entering through the doorway 20a. There is a parking place 22, in which the vehicles 10 and 12 are parked, at the back of the departure/arrival place 28. Basically, the user 16 is permitted to enter up to the departure/arrival area 28, and the user 16 is restricted from entering the parking place 22. The user 16 deposits the vehicle 10 and 12 in the automated valet parking system 30 at the departure/arrival place 28. Further, the user 16 receives the vehicle 10 and 12 at the departure/arrival place 28 from the automated valet parking system 30. The automated valet parking facility 20 has a doorway 20b for the user 16 in addition to the doorway 20a for the vehicles 10 and 12. Whereas The doorway 20a for the vehicles 10 and 12 is connected to a road, the doorway 20b for the user 16 is connected, for example, to a residential building where the user 16 lives.

The parking place 22 includes a plurality of charging parking frames 24 and one or more ordinary parking frames 26. The charging parking frame 24 is a parking frame with a charging device, and the ordinary parking frame 26 is a parking frame without a charging device. In FIG. 1, the charging parking frame 24 is represented by shading, and the ordinary parking frame 26 is represented by white. The charging device in the charging parking frame 24 may be a contact type from which a cable is connected to a vehicle for charging, or it may be a non-contact type which wirelessly transmits electric power from a power transmission coil on the ground side to the power receiving coil of the vehicle side. According to the contact type charging device, the cable is automatically connected by a robot arm. Further, a charging device in a charging parking frame 24 may be either a quick charging device or a normal charging device.

Due to the structure of the automated valet parking facility 20, distances from the departure/arrival place 28 to the parking frames 24 and 26 are not the same. Here, the distances from the departure/arrival place 28 means a path from the departure/arrival place 28 to the parking frames 24 and 26. In FIG. 1, the parking frames 24 and 26 are existing in a line starting from the departure/arrival place 28. to make it easy to understand the structural features of the automated valet parking facility 20. Even among the plurality of charging parking frames 24, there is a difference in distances from the departure/arrival place 28.

Vehicles 10 and 12, which can utilize the automated valet parking facility 20, include an EV (Electric Vehicle) 10 that has a battery as a power source and necessarily requires battery charging and a non-EV 12 that has a power source other than a battery and does not require battery charging or does not necessarily require battery charging. The non-EV 12 referred to here is a vehicle other than an EV 10 including an engine vehicle with only an engine, as well as a hybrid vehicle, a plug-in hybrid vehicle, or a fuel-cell vehicle. The charging parking frame 24 is preferentially assigned to the EV 10, and the ordinary parking frame 26 is preferentially assigned to the non-EV 12.

The vehicles 10 and 12 are the vehicles being adapted to the automated valet parking service. The vehicles 10 and 12 may be bus-type vehicles used in MaaS if they are adapted to the automated valet parking service. Within the automated valet parking facility 20, the vehicles 10 and 12 are configured so that they can automatically drive at least on a route between the departure/arrival place 28 and the designated parking frames 24 and 26 based on a various kind of information and automatically park in the designated parking frames 24 and 26. Automatic driving and automatic parking are carried out by a vehicle control system loaded on the vehicles 10 and 12. The vehicle control system is wirelessly connected to the automated valet parking system 30. Detailed description of their methods is omitted because there are various methods for automatic driving and automatic parking which are publicly known and there is no limitation on the method itself for automatic driving and automatic parking in the present disclosure.

The automated valet parking system 30 includes a management device 32 and a storage device 34. The management device 32 is a computer connected to the vehicle control system via a wireless network. The management device 32 is also connected to a mobile terminal 18 of the user 16 via a wireless network. The management device 32 manages membership information of the user 16 of the automated valet parking service, and executes various processes necessary for realizing the automated valet parking service including reservation and usage authentication of the automated valet parking facility 20. Further, the management device 32, manages the parking positions of the vehicle 10 and 12, in particular, the parking position of the EV 10, within the parking place 22 and carries out guiding the vehicles 10 and 12 by automatic driving from the departure/arrival place 28 to the parking place 22 at the time of entry and guiding the vehicle 10 and 12 by automatic driving from the parking place 22 to the departure/arrival place 28 at the time of departure.

The storage device 34 is a storage that is embedded inside or externally attached to the management device 32 or a data server that is connected to the management device 32 via a network. The storage device 34 stores the membership information of the user 16 and reservation information of the automated valet parking facility 20. Further, the storage device 34 stores a vehicle usage schedule for each of the vehicles 10 and 12 which is acquired from the mobile terminal 18 of the user 16 by the management device 32.

The mobile terminal 18 is a terminal capable of wireless communication and portable by the user 16. Some examples of the mobile terminal 18 include a smart phone and a tablet PC. The mobile terminal 18 stores registration information associating the mobile terminal 18 with the vehicles 10 and 12. When an AVP application, which is a dedicated application, is downloaded to the mobile terminal 18 and activated, various functions such as reservation for use of the automated valet parking facility 20, automatic entry into the parking place 22, automatic departure out of the parking place 22, and the like can be used. The mobile terminal 18 is connected to the management device 32 via a wireless network.

Figure 2:
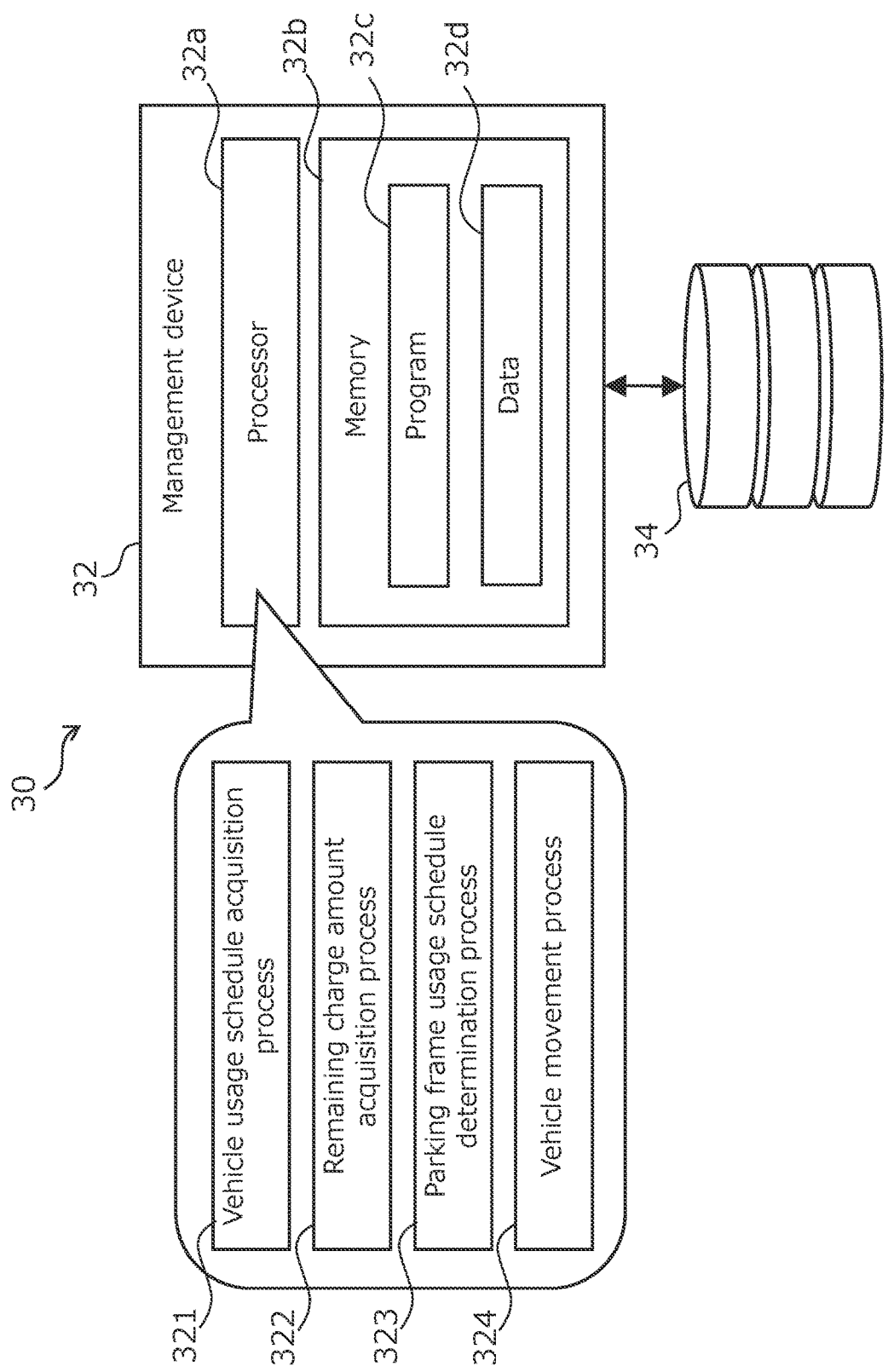
FIG. 2 is a block diagram showing a configuration of the automated valet parking system relating to the first embodiment of the present disclosure.

Next, the configuration of the automated valet parking system 30 is described with reference to FIG. 2. The management device 32 constituting the automated valet parking system 30 comprises one or more processors 32a (hereinafter, simply referred to as the processor 32a) and one or more memories 32b (hereinafter, simply referred to as the memory 32b) coupled to the processor 32a. The memory 32b stores one or more programs 32c (hereinafter, simply referred to as the program 32c) executable by the processor 32a and various data 32d related to them. The memory 32b includes a main storage device and an auxiliary storage device. The program 32c and the data 32d may be stored either in the main storage device or in a computer-readable recording medium which is the auxiliary storage device.

The program 32c includes a program for causing the processor 32a to manage the parking position of the EV 10 within the parking place 22. The data 32d includes map data in the parking place 22 including the position of each of the parking frames 24 and 26. When the above program is executed by the processor 32a, a vehicle usage schedule acquisition process 321, a remaining charge amount acquisition process 322, a parking frame usage schedule determination process 323, and a vehicle movement process 324 is executed by the management device 32 (processor 32a).

The vehicle usage schedule acquisition process 321 is, for example, a process for acquiring the vehicle usage schedule of the EV 10 inputted by the user 16 via the mobile terminal 18 and registering it in the storage device 34. The vehicle usage schedule includes, for example, a date of use, entry time, and departure time of the automated valet parking facility 20. The vehicle usage schedule may be automatically acquired from a personal schedule registered in a cloud by the use 16 of the EV 10.

The remaining charge amount acquisition process 322 is a process for acquiring a remaining charge amount of a battery of the EV 10. The remaining charge amount is measured by the vehicle control system of the EV 10 and transmitted to the management device 32 from the vehicle control system by radio communication. The initial value of the remaining charge amount is the remaining charge amount measured when the EV 10 actually enters the automated valet parking facility 20. The management device 32 acquires the remaining charge amount from the respective EV 10 in the parking place 22 at regular intervals.

The parking frame usage schedule determination process 323 is a process for determining the parking frame usage schedule of the charging parking frame 24 based on the vehicle usage schedule of the respective EV 10 using the automated valet parking facility 20 and the remaining charge amount of the respective EV 10. The parking place 22 includes a plurality of charging parking frames 24 so as to be able to cope with a plurality of EVs 10 at the same time. However, each charging parking frame 24 has different distance from the departure/arrival place 28. The parking frame usage schedule is a process for determining which charging parking frame 24 is assigned to which EV 10. Details of the parking frame usage schedule determination process 323 is described later.

The vehicle movement process 324 is a process for moving the EV 10 according to the parking frame usage schedule. More specifically, in the vehicle movement process 324, the EV 10 parked at the departure/arrival place 28 is guided to the charging parking frame 24 assigned to the EV 10 by automatic driving. The non-EV 12 is also assigned to the ordinary parking frame 26 and guided automatically driven by the automated valet parking system 30. However, since the process for the non-EV 12 is not a feature of the present disclosure, a description thereof is omitted.

Hereinafter, focusing only on the process for the EV 10, the functions of the automated valet parking system 30, particularly the parking frame usage schedule determination process 323 executed by the management device 32, is described in detail with reference to FIGS. 3 to 6.

The management device 32, with respect to an EV 10 scheduled to be used on the next day, assign a charging parking frame 24 closer to the departure/arrival place to an EV 10 having earlier use start time on the next day. The management device 32 refers to a database 36 stored in the storage device 34 to execute the process. The vehicle usage schedule for each EV 10 is registered in the database 36. In the database 36, at least a vehicle ID and departure time of the EV 10 using the automated valet parking facility 20 are associated with each other.

Figure 3:
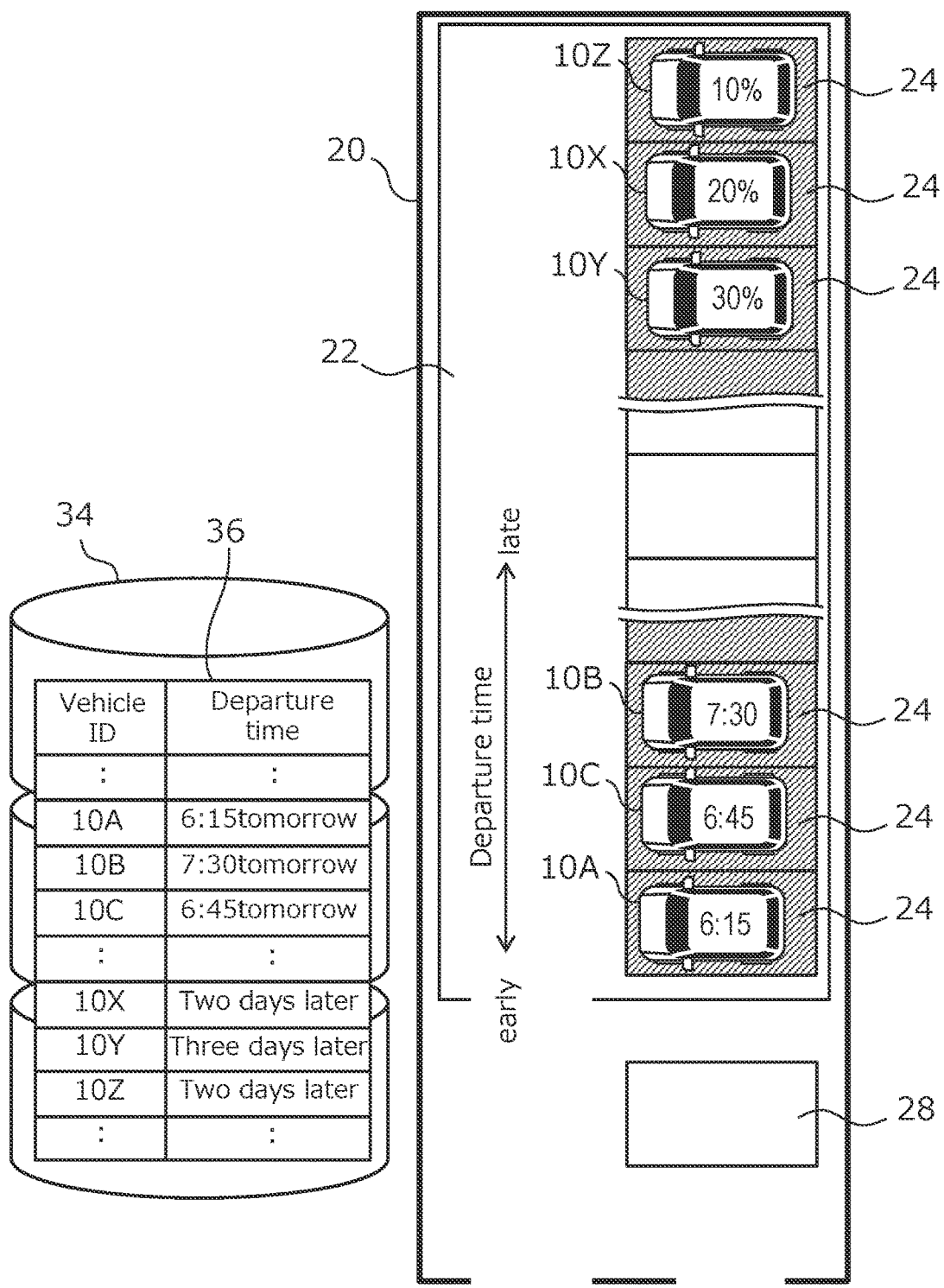
FIG. 3 is a schematic diagram for explaining a function of the automated valet parking system relating to the first embodiment of the present disclosure.

In the embodiment shown in FIG. 3, among six EVs 10A, 10B, 10C, 10X, 10Y, and 10Z registered in the database 36, the EVs 10A, 10B, and 10C are scheduled to be used on the next day. Among them, the earliest departure time is 6:15 for the EV 10A, then 6:45 for EV 10C, and then 7:30 for EV 10B. In this case, the management device 32 assigns the charging parking frame 24 closest to the departure/arrival place 28 to the EV 10A, of which the departure time is the earliest. It assigns the charging parking frame 24 next closest to the departure/arrival place 28 to the EV 10C, of which the departure time is the next earliest. Then, it assigns the charging parking frame 24 further from the departure/arrival place 28 to the EV 10B than them assigned to the EV 10A and 10C.

Assigning the charging parking frame 24 based on the use start time on the next day as described above, it is possible for the EVs 10 to depart in the order starting from the EV 10 parked at the charging parking frame 24 close to the departure/arrival place 28. It is not only effective to assure the user 16 of the EV 10 who wants to depart early but also effective to prevent traffic congestion due to flow line interference between EVs 10.

On the other hand, with respect to the EV 10 scheduled to be used only after the day after tomorrow, assigning the charging parking frame 24 close to the departure/arrival place 28 is only an obstacle. If it is not scheduled to be used on the next day, there is no problem even if a charging parking frame 24 far from the departure/arrival place 28 is assigned. Therefore, the management device 32, with respect to an EV 10 not scheduled to be used on the next day, assigns a charging parking frame 24 farther from the departure/arrival place 28 to an EV 10 with smaller remaining charge amount. The remaining charge amount referred to here is the remaining charge amount at the present time.

In the embodiment shown in FIG. 3, there are three EVs 10X, 10Y, and 10Z that are scheduled to be used only after the day after tomorrow. It is assumed that the remaining charge amount of the EV 10X is 20%, the remaining charge amount of the EV 10Y is 30%, and the remaining charge amount of the EV 10Z is 10% at the present time. In this case, the management device 32 assigns the charging parking frame 24 farthest from the departure/arrival place 28 to the EV 10Z, of which the remaining charge amount at present is the lowest. It assigns the charging parking frame 24 next farthest from the departure/arrival place 28 to the EV 10X, of which the remaining charge amount is the next lowest. Then, it assigns the charging parking frame 24 closer to the departure/arrival place 28 to the EV 10Y than them assigned to the EVs 10X and 10Z.

Figure 4:
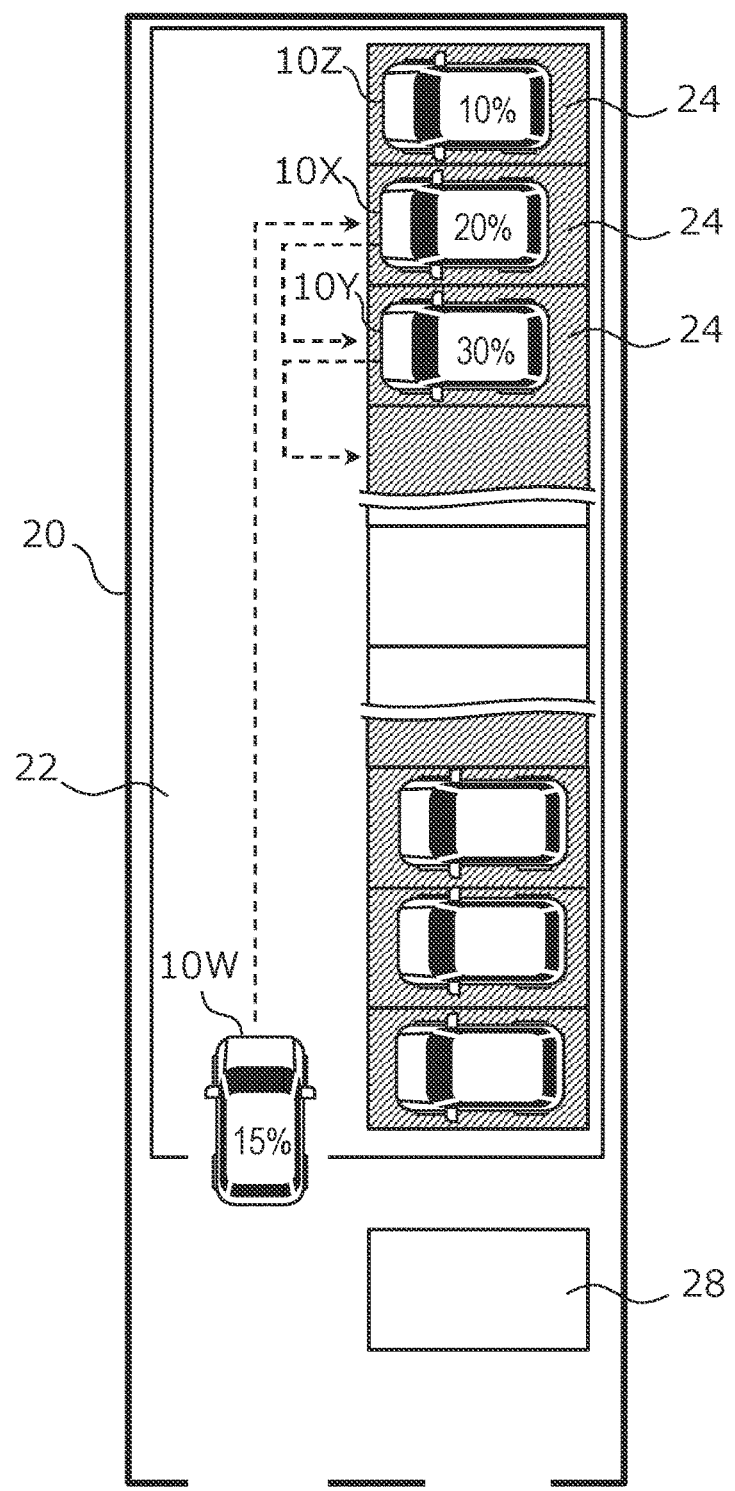
FIG. 4 is a schematic diagram for explaining a function of the automated valet parking system relating to the first embodiment of the present disclosure.

Here, it is assumed that the EV 10W, of which the remaining charge amount is 15% at present, enter the place as shown in FIG. 4. The remaining charge amount of the EV 10W is larger than the remaining charge amount of the EV 10Z, but smaller than the remaining charge amount of the EVs 10X and 10Y. In this case, the management device 32 moves the parking position of the EV 10X and the EV 10Y one frame at a time to the charging parking frame 24 close to the departure/arrival place 28, respectively. Next, the management device 32 assigns the charging parking frame 24 at which the EV 10X has been parked to EV 10W.

By assigning a charging parking frame 24 far from the departure/arrival place 28 to an EV 10 which requires time for charging as described above, it is possible to prevent a decrease in turnover of the charging parking frame 24 close to the departure/arrival place 28. In the above-described embodiment, assignment of the charging parking frame 24 among the EVs 10W, 10X, 10Y, and 10Z is determined again based on the remaining charge amount at the time of entry of the EV 10X. However, it may make the charging parking frame 24 to be assigned to the EV 10X vacant in advance by estimating the entry time and the remaining charge amount at its time of the EV 10X prior to the entry time. Here, the entry time of the EV 10X can be acquired from the vehicle usage schedule registered in the storage device 34. The remaining charge amount of the EV 10X at the entry time can be estimated, for example, from the remaining charge amount at the time when the EV 10X starts returning from the workplace and the distance from the workplace to the automated valet parking facility 20.

By the way, the scheduled use time and date is not necessarily registered in the vehicle usage schedule for every EV 10. However, from the perspective of the provider of the automated valet parking service, it is desirable that as many users 16 of the EV 10 as possible register the scheduled use time and date of the EV 10 in the vehicle usage schedule. This is because the higher the rate of registering the scheduled use time and date of the EV 10 is, the more appropriate assignment of the charging parking frames 24 becomes possible. Therefore, the management device 32 assigns a charging parking frame close to the departure/arrival place to an EV 10 whose scheduled use time and date is registered in the vehicle usage schedule in preference to an EV whose scheduled use time and date is not registered.

Figure 5:
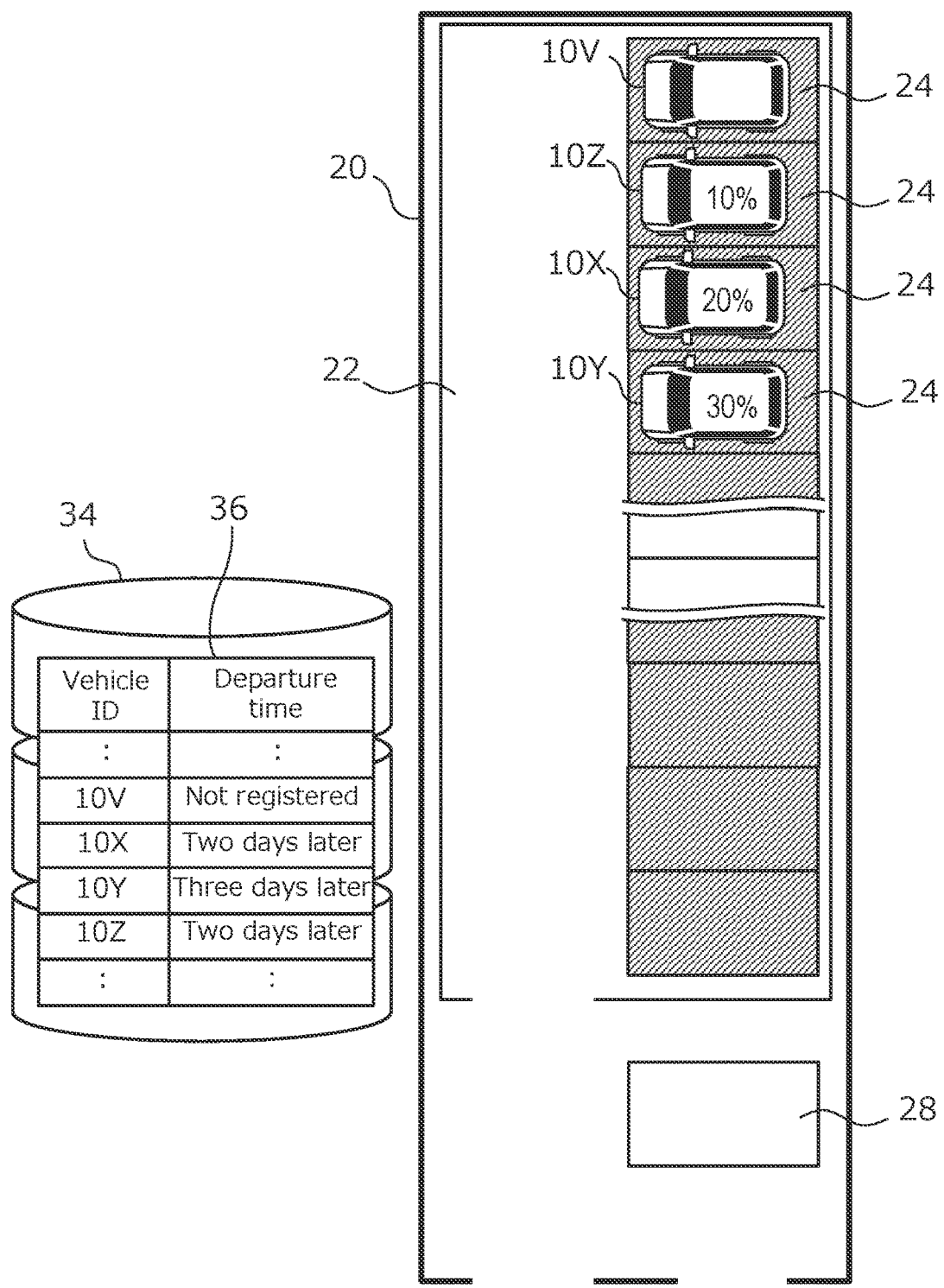
FIG. 5 is a schematic diagram for explaining a function of the automated valet parking system relating to the first embodiment of the present disclosure.
Figure 6:
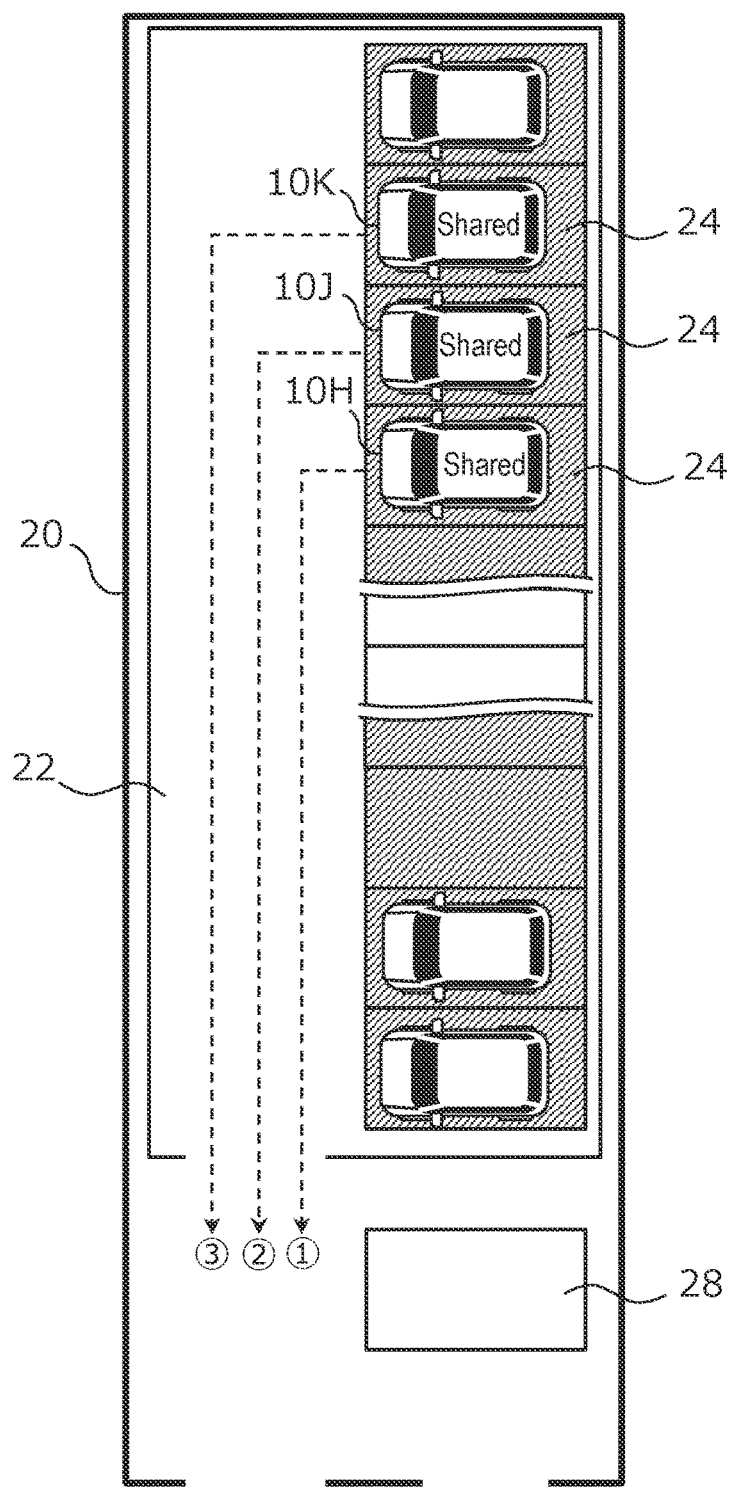
FIG. 6 is a schematic diagram for explaining a function of the automated valet parking system relating to the first embodiment of the present disclosure.

In the embodiment shown in FIG. 5, there is an EV 10y, of which the usage schedule is not registered, in addition to the EVs 10X, 10Y, and 10Z, of which the usage schedule after the day after tomorrow is registered. With respect to the EV 10y, of which the usage schedule is not registered, the management device 32 assigns the charging parking frame farther from the departure/arrival place 24 than that assigned to the EVs 10X, 10Y, and 10Z, of which the usage schedule is registered, regardless of its remaining charge.

When such a process is executed, it is more convenient for the user 16 of the EV 10 to register the scheduled use date and time, so that it is possible to urge the user 16 of the EV 10 to register the scheduled use date and time. Incidentally, when there are a plurality of EVs 10 of which the scheduled use time and date is not registered, the management device 32 assigns a charging parking frame 24 farther from the departure/arrival place 28 to an EV 10 with smaller remaining charge amount.

As described above, by determining the parking frame usage schedule of the charging parking frame 24 based on the vehicle usage schedule and the remaining charge amount of each EV 10, it is possible to reduce inconvenience to the user 16 of the EV 10 using the automated valet parking service.

Incidentally, the EV 10 parked in the automated valet parking facility 20 may be a sharing service vehicle. There is no difference in basic processes depending on whether the EV 10 is a privately owned vehicle or a sharing service vehicle. However, when the EV 10 is a sharing service vehicle, use start time on the next day is often unknown. In the embodiment shown in FIG. 6, EVs 10K, 10J, and 10H are sharing service vehicles. The EVs 10K, 10J, and 10H for sharing service, of which use start time on the next day is not registered, are parked at the charging parking frame 24 far from the departure/arrival place 28.

The management device 32 preferentially rent out an EV 10 which is parked at a charging parking frame 24 close to the departure/arrival place when requested to rent out an EV 10 for sharing service. According to the embodiment shown in FIG. 6, the management device 32 first rents out the EV 10H, then rents out the EV 10J, and finally rents out the EV 10K. By renting out in the order starting from an EV 10 which is parked at a charging parking frame 24 close to the departure/arrival place 28 as described above, it is possible to quickly respond to the needs of the users of sharing service. Further, by assigning a charging parking frame 24 far from the departure/arrival place 28 to an EV 10 for sharing service having a small remaining charge amount, it is possible to prevent an EV 10 having an insufficient remaining charge amount from being rent out.

2. Second Embodiment

Figure 7:
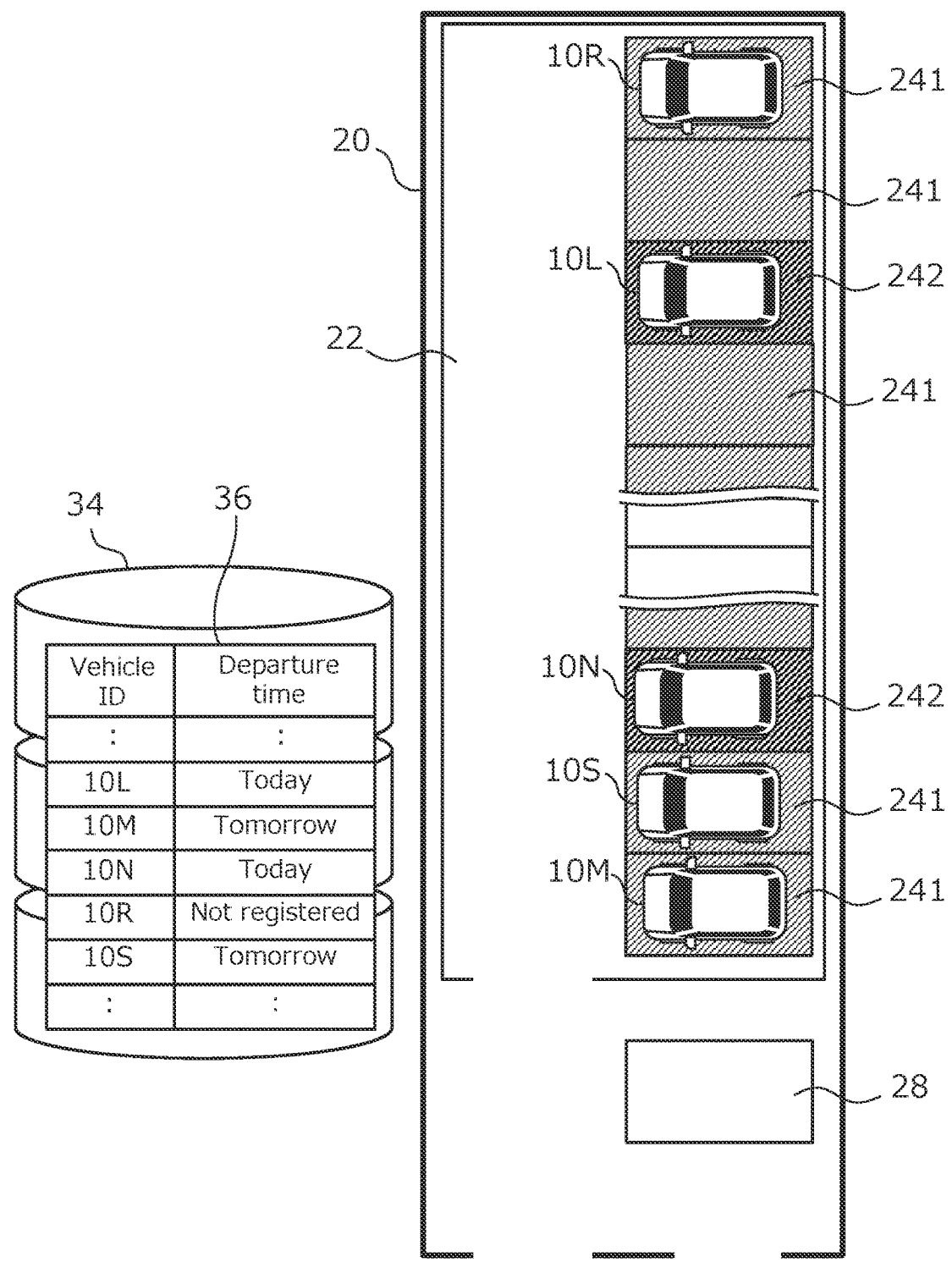
FIG. 7 is a schematic diagram for explaining a function of the automated valet parking system relating to the second embodiment of the present disclosure.

Next, the second embodiment of the present disclosure is described. FIG. 7 is a schematic diagram for explaining the function of the automated valet parking system according to the second embodiment of the present disclosure. The parking place 22 has two types of charging parking frames, a normal charging parking frame 241 and a quick charging parking frame 242, in the second embodiment whereas it has one type of charging parking frame 24 in the first embodiment. The normal charging parking frame 241 is a charging parking frame having a normal charging device. The quick charging parking frame 242 is a charging parking frame having a quick charging device. Either a normal charging device and a quick charging device may be either a contact type or a non-contact type.

In the present embodiment, the assignment of the normal charging parking frame 241 and the quick charging parking frame 242 is decided based on the usage schedule of the EV 10. In the embodiment shown in FIG. 7, entry time of five EVs 10L, 10M, 10N, 10R, and 10S is registered in the database 36. Among them, the EVs 10L and 10N are scheduled to be used today, the EV 10M and 10S are scheduled to be used tomorrow, and the EV 10R has no use schedule registered.

The management device 32 preferentially assigns the quick charging parking frames 242 to the EVs 10L and 10N, which are scheduled to be used today. Then, it preferentially assign the normal charging parking frames 241 to the EVs 10M, 10R, and 10S that are not scheduled to be used today. The EV 10R, whose use schedule is not registered in the database 36, is treated as an EV that is not scheduled to be used today.

According to the present embodiment, by preferentially assigning the normal charging parking frames 241 to the EVs 10M, 10R, and 10S, which are not scheduled to be used today, they can be charged using a relatively inexpensive nighttime fee. It is also possible to prevent the quick charging parking frame 242 from being occupied by the EVs 10M, 10R, and 10S, which do not require rapid charging.

Among the EVs 10M, 10R, and 10S, which are not scheduled to be used today, the charging parking frames 24 are assigned in the same manner as in the first embodiment. With respect to the EVs 10M, and 10S, which are scheduled to be used tomorrow, the charging parking frame closer to the departure/arrival place is assigned to the EV whose scheduled use start time is earlier. With respect to the EV 10R, whose use schedule is not registered, the charging parking frame far from the departure/arrival place is assigned depending on the remaining charge amount. Between the EVs 10L and 10N, which are scheduled to be used today, the charging parking frame 24 closer to the departure/arrival place 28 may be assigned to the EV whose scheduled use time is earlier.

3. Other Embodiments

The automated valet parking system of the present disclosure can also be applied to a parking place distributed in a plurality of locations. In the embodiment shown in FIG. 8, there is a parking place (underground parking place) 48 available to an automated valet parking of an EV 10 in the underground of a residential building 40 in which a user 16 of an EV 10 lives. A user 16 can, for example, move between a floor of the residential room 44 and an underground parking place 48 using the elevator 42. Further, there is another parking place (off-site parking place) 62 which is also available to an automated valet parking of an EV 10 in a parking place building 60 remote from the residential building 40.

In this embodiment, an EV 10 scheduled to be used on the next day is parked in the underground parking place 48. Then, a charging parking frame closer to the departure/arrival place is assigned to an EV 10 whose use start time on the next day is earlier. The departure/arrival place for an EV 10 may exist in the underground of the residential building 40 as well as the underground parking place 48 or may be an aboveground doorway of the residential building 40. On the other hand, within the off-site parking place 62, an EV 10 not scheduled to be used on the next day and an EV 10 whose use schedule is not registered are parked. Then, a charging parking frame farther from the departure/arrival place is assigned to an EV 10 with smaller remaining charge amount. An EV 10 is guided automatically driven from the off-site parking place 62 to the departure/arrival place.

What is claimed is:

1. An automated valet parking system for providing an automated valet parking service in a parking place used by a plurality of EVs, the parking place including a plurality of charging parking frames with different distances from a departure/arrival place, the automated valet parking system comprising:
    a storage device configured to store a vehicle usage schedule for each of the plurality of EVs; and
    a management device configured to manage parking positions of the plurality of EVs in the parking place,
    wherein the management device is configured to execute:
        acquiring a remaining charge amount for each of the plurality of EVs:
        determining a parking frame usage schedule of the plurality of charging parking frames based on the vehicle usage schedule for each of the plurality of EVs and the remaining charge amount for each of the plurality of EVs, the parking frame usage schedule determining which one of the plurality of charging parking frames is assigned to each one of the EVs, respectively,
            with respect to an EV scheduled to be used on a next day, to assign a charging parking frame closer to the departure/arrival place as a start time of use of an EV on the next day is earlier, and
            with respect to an EV not scheduled to be used on a next day and an EV with unknown usage schedule, to assign a charging parking frame farther from the departure/arrival place as the remaining charge amount of an EV is smaller; and
        moving the plurality of EVs within the parking place according to the parking frame usage schedule.

2. The automated valet parking system according to claim 1, wherein the management device is configured to assign a charging parking frame closer to the departure/arrival place to an EV whose scheduled use time and date is registered in the vehicle usage schedule in preference to an EV whose scheduled use time and date is not registered in the vehicle usage schedule.

3. The automated valet parking system according to claim 1, wherein:
    the plurality of charging parking frames includes a quick charging parking frame with a quick charging device and a normal charging parking frame with a normal charging device; and
    the management device is configured to preferentially assign the quick charging parking frame to an EV scheduled to be used today, and preferentially assigns the normal charging parking frame to an EV not scheduled to be used today.

4. The automated valet parking system according to claim 1, wherein:
    at least some of the plurality of EVs are sharing service vehicles; and
    the management device is configured to preferentially rent out a sharing service vehicle which is parked in the charging parking frame close to the departure/arrival place when requested to rent out the sharing service vehicle.

5. A method for providing an automated valet parking service in a parking place used by a plurality of EVs, the parking place including a plurality of charging parking frames having different distances from a departure/arrival place, the method comprising:
    registering a vehicle usage schedule for each of the plurality of EVs in advance;
    acquiring a remaining charge amount for each of the plurality of EVs;
    determining a parking frame usage schedule of the plurality of charging parking frames based on the vehicle usage schedule for each of the plurality of EVs and the remaining charge amount for each of the plurality of EVs, the parking frame usage schedule determining which one of the plurality of charging parking frames is assigned to each one of the EVs, respectively,
        with respect to an EV scheduled to be used on a next day, to assign a charging parking frame closer to the departure/arrival place as a start time of use of an EVs on the next day is earlier, and
        with respect to an EV not scheduled to be used on a next day and an EV with unknown usage schedule, to assign a charging parking frame farther from the departure/arrival place as the remaining charge amount of an EV is smaller; and
    moving the plurality of EVs within the parking place according to the parking frame usage schedule.

6. A non-transitory computer-readable storage medium storing a program for causing a computer to manage parking positions of a plurality of EVs in a parking place used by a plurality of EVs to provide an automated valet parking service in the parking place having a plurality of charging parking frames with different distances from a departure/arrival place, the program being configured to cause the computer to:
    acquire a vehicle usage schedule for each of the plurality of EVs registered in advance;
    acquire a remaining charge amount for each of the plurality of EVs;
    determine a parking frame usage schedule of the plurality of charging parking frames based on the vehicle usage schedule for each of the plurality of EVs and the remaining charge amount for each of the plurality of EVs, the parking frame usage schedule determining which one of the plurality of charging parking frames is assigned to each one of the EVs, respectively,
        with respect to an EV scheduled to be used on a next day, to assign a charging parking frame closer to the departure/arrival place as a start time of use of an EVs on the next day is earlier, and
        with respect to an EV not scheduled to be used on a next day and an EV with unknown usage schedule, to assign a charging parking frame farther from the departure/arrival place as the remaining charge amount of an EV is smaller; and move the plurality of EVs within the parking place according to the parking frame usage schedule.

\* \* \* \* \*